3,458,558
PURIFICATION OF ISOCYANATES BY REDUCING THE HYDROLYZABLE CHLORINE CONTENT
Chao Shing Cheng, Williamsville, N.Y., assignor to Allied Chemical Corporation, New York, N.Y., a corporation of New York
No Drawing. Filed Oct. 25, 1963, Ser. No. 318,831
Int. Cl. C07c 119/04
U.S. Cl. 260—453                 8 Claims The present invention relates to a novel process of reducing the hydrolyzable chlorine content of organic isocyanates. More particularly, it relates to the treatment of organic isocyanates with certain metals and thereafter recovering isocyanates substantially devoid of hydrolyzable chlorine.

The production of organic isocyanates is well known and is practiced on an increasingly important commercial scale. Briefly stated, the usual process involves the reaction between a primary amine and phosgene. The initial product formed is the carbamyl chloride derivative of the amine which upon being heated, usually in the presence of excess phosgene, is decomposed into the isocyanate and hydrogen chloride. The latter, together with the excess phosgene, is removed and the isocyanate recovered by distillation. Although great care is usually expended to complete the pyrolysis of the carbamyl chloride and the subsequent removal of the excess phosgene and hydrochloric acid, the isocyanate product inevitably contains traces of these contaminants along with other chlorine containing by-products.

Inasmuch as the major disposition of the organic isocyanates produced is in the preparation of urethane polymers wherein the organic isocyanates, mainly diisocyanates, are reacted with poly functional substances, such as polyethers, polyesters and the like, it is desirable that the particular isocyanates be fairly consistent in reactivity from lot to lot. Furthermore, the large scale manufacture of urethane polymers used in the production of rigid or flexible foams, elastomers and coatings, is a highly developed art requiring strict adherence to set formulations of isocyanate, polyol, catalysts, dispersing agents, etc., in order to obtain satisfactory products and most important reproducibility.

The "hydrolyzable chlorine" content of isocyanates is a measure of the chlorine containing constituents titratable with standard alkali of the organic isocyanates. This value is generally expressed as percent by weight hydrolyzable chlorine content. The hydrolyzable chlorine content of treated isocyanate compositions can be determined simply by extracting the isocyanate composition with a boiling mixture of methanol and water. This extract is then titrated potentiometrically in known manner. (ASTM Test Method D1638–61T Section 44.)

Since it is known that acidic substances influence the reactivity of isocyanates in the urethane reaction as well as, in certain instances, the color of the urethane polymer, it is desirable to produce the isocyanates with at least a constant hydrolyzable chlorine content and preferably with an extremely low hydrolyzable chlorine content.

It is therefore a principal object of the present invention to provide a process for reducing the hydrolyzable chlorine content of organic isocyanates to an extremely low value.

Another object is to provide a process for treating organic isocyanates with certain metals whereby the hydrolyzable chlorine content of the treated material is reduced substantially.

These and other objects of this invention will be obvious from the following specifications.

It has now been discovered that upon treatment, i.e. by heating, organic isocyanates at a temperature above about 100° C. but below that at which substantial decomposition of the isocyanate occurs, in the presence of a metal of the group consisting of copper, silver, nickel, iron and zinc and thereafter separating, e.g., by distillation the treated isocyanate, the latter is obtained having a substantially reduced content of hydrolyzable chlorine.

Other metals, such as magnesium, antimony and chromium, were tested and found without significant effect; lithium and tin were found to cause polymerization of the isocyanate and impractical.

The novel procedure is preferably conducted at temperature within the range of 150° to 220° C. and especially at 210° to 215° C. The metal treating agent is preferably in comminuted form and especially copper powder is used.

The isocyanate to be treated may be in the crude, i.e. undistilled state as conventionally obtained by reaction of a primary organic amine with phosgene before or after distillation of solvent, or the distilled material can be so treated.

The process of the present invention is effective in reducing the "hydrolyzable chlorine" of isocyanates of all types. Thus, aliphatic, cycloaliphatic, aromatic and heterocyclic mono and polyisocyanates can be so treated. Typical of these well known valuable organic derivatives are the following by way of example:

Octylisocyanate
Dodecylisocyanate
Hexamethylenediisocyanate
3,3'-diisocyanatodipropylether
Cyclohexane-1,4-diisocyanate
4,4'-methylene-bis-(cyclohexylisocyanate)
1,4-phenylene-diisocyanate
Tolylene diisocyanates
Xylylene-1,4-diisocyanates
4,4'-methylene-bis(phenylisocyanate)
Naphthalene-1,4-diisocyanate
p,p',p"-Triphenylmethanetriisocyanate Mixtures of these and equivalent isocyanates are contemplated also, such as the commercially available mixtures of 2,4- and 2,6-tolylene diisocyanates.

The metal treatment agents can be used in a variety of forms, as pellets, rods, wire mesh and powders. The amount of agent added is not critical, although sufficient of the agent should be used to provide a convenient operation with respect to time and ease of removal. Generally this amount will be within 0.1 and 5% by weight of the isocyanate composition being treated. The agent can be added to the isocyanate and the mixture agitated to insure thorough contact of the metal with the isocyanate during the treatment. Alternatively, the treatment can be carried out in a continuous manner by passing the isocyanate through a bed of the metal at a rate such that sufficient contact is obtained to accomplish the desired end.

The time required to accomplish the desired reduction of "hydrolyzable chlorine" will vary according to several factors of which the temperature of the treatment, hydrolyzable chlorine content of the untreated isocyanate and activity of the metal treatment agent are the more important. Thus the higher the temperature the less time will be required; the greater the "hydrolyzable chlorine" of the untreated isocyanate the longer the time required and the more active the metal, the shorter the time. In general, the treatment will require at least about 0.5 but rarely more than 10 hours, and usually a period of 1 to 2 hours will suffice to effect a substantially complete removal of hydrolyzable chlorine from the isocyanate composition.

The following examples will illustrate the process of the present invention. Parts and percentages are by weight and temperatures are given in degrees centigrade.

Example I

A mixture of 30 parts of distilled tolylene diisocyanates (a mixture of about 80% 2,4- and 20% 2,6-tolylenediisocyanates) containing 0.31% "hydrolyzable chlorine," and 0.3 part of copper bronze powder is heated to 220° and agitated at 210° to 215° for 2 hours. The mixture is then distilled at a pressure of 2.5 mm. to recover tolylene diisocyanate having a "hydrolyzable chlorine" value of 0.002%.

Example II

Crude, i.e. undistilled, tolylene diisocyanate having a hydrolyzable chlorine content of 1.77%, and a distinct odor of phosgene is treated as described in Example I with 0.3 part of copper metal powder. The tolylene diisocyanate distilled from the mixture has a hydrolyzable chlorine value of 0.002% and phosgene cannot be detected by use of a conventional test for this substance (Aromil Phosgene Detector Crayon #1).

Example III

The procedure of Example I is repeated using 0.3 part of iron powder. The distilled tolylene diisocyanate thus obtained has a hydrolyzable chlorine content of 0.004%.

Example IV

In a similar manner to that described in Example I above, 0.3 part of zinc dust is effective in reducing the hydrolyzable chlorine content of the distilled tolylene diisocyanate from 0.31% to 0.007%.

Example V

Repetition of the procedure of Example I above using in place of copper a like quantity of magnesium, antimony or chromium as the metal treating agent gives no significant reduction in the hydrolyzable chlorine content of the tolylene diisocyanate.

Similarly, attempts to utilize lithium metal or tin powder as the treating metal in this procedure resulted in polymerization of the isocyanate mixture to a thick viscous material.

These metals are obviously not suited for use in the process of our invention.

Example VI–XII

Distilled 4,4'-methylene-bis(phenylisocyanate) having a relatively high content of hydrolyzable chlorine is treated with various proportions of the agents indicated in the table below, with the results indicated. The procedure is as described in Example I above with the exception that following the treatment and prior to distillation the mixture is filtered to remove the metal.

TABLE

| Ex. | Agent | Amount | Time of treatment (hrs.) | Temperature of treatment (deg.) | Percent hydrolyzable chlorine | |
|---|---|---|---|---|---|---|
| | | | | | Before | After |
| VI | None | | 2 | 200 | 0.0164 | .0062 |
| VII | Cu | 0.5 | 2 | 200 | 0.0164 | .0002 |
| VIII | Cu | 0.5 | 2 | 150 | 0.0164 | .0041 |
| IX | Cu Bronze | 0.5 | 2 | 200 | 0.0164 | .0001 |
| X | None | | 2 | 200 | 0.0354 | .0137 |
| XI | Cu Bronze | 0.25 | 2 | 200 | 0.0354 | .0017 |
| XII | Ni | 0.5 | 2 | 200 | 0.0164 | .0027 |

Example XIII

A mixture of 30 parts of distilled tolylene diisocyanates (a mixture of about 80% 2,4- and 20% 2,6-tolylene diisocyanates) containing 0.003% "hydrolyzable chlorine," and about 1 part of silver metal in the form of spongy granules is heated for 2 hours at 210° to 215°. The mixture is filtered and the filtrate is distilled to recover tolylene diisocyanates having a "hydrolyzable chlorine" value of 0.0006%.

It can thus be seen that a simple effective and economical procedure has been developed to treat isocyanate compositions containing relatively large, and widely varying amounts of acidic impurities and thus to obtain isocyanate compositions with substantially reduced and consistently low to vanishing amounts of said acidic impurities.

Although certain preferred embodiments of the invention have been disclosed for purpose of illustration, it will be evident that various changes and modifications may be made therein without departing from the scope and spirit of the invention. For example compounds of the metals effective in the process of this invention which decompose at the temperature of the procedure into the said metals can be used also.

We claim:

1. A process for treating an organic isocyanate containing hydrolyzable chlorine as an impurity which comprises heating a mixture of an organic isocyanate containing hydrolyzable chlorine and an agent selected from the group consisting of copper, silver, nickel, iron and zinc, at a temperature above about 100° C. but below that at which substantial decomposition of the organic isocyanate occurs, and recovering organic isocyanate having a substantially reduced content of hydrolyzable chlorine from the treated mixture.

2. The process of claim 1 in which the isocyanate is a tolylene diisocyanate.

3. A process for treating an organic isocyanate containing hydrolyzable chlorine as an impurity which comprises heating a mixture of an organic isocyanate containing in excess of 0.01% by weight hydrolyzable chlorine and an agent selected from the group consisting of copper, silver, nickel, iron, and zinc, at a temperature above about 100° C. but below that at which substantial decomposition of the organic isocyanate occurs, and recovering organic isocyanate having a hydrolyzable chlorine below 0.005% from the treated mixture.

4. The process of claim 3 in which the isocyanate is a tolylene diisocyanate.

5. The process of claim 3 in which the isocyanate is 4,4'-methylene bis(phenylisocyanate).

6. The process of claim 3 in which the temperature is in the range of about 150°–220° C.

7. The process of claim 6 in which the agent is copper.

8. A process which comprises heating a mixture of an aromatic isocyanate containing hydrolyzable chlorine as an impurity with copper, iron, or zinc at a temperature above 100° C. but below decomposition temperature of the isocyanate and recovering purified isocyanate.

References Cited

UNITED STATES PATENTS 3,155,699    11/1964    Powers _____ 260—453

CHARLES B. PARKER, Primary Examiner

DOLPH H. TORRANCE, Assistant Examiner

U.S. Cl. X.R.

260—2.5, 75, 77.5, 389